United States Patent
Schmid et al.

(10) Patent No.: US 10,035,601 B2
(45) Date of Patent: Jul. 31, 2018

(54) RAM AIR CHANNEL ASSEMBLY AND METHOD FOR OPERATING A RAM AIR CHANNEL ASSEMBLY

(71) Applicant: Airbus Operations GmbH, Hamburg (DE)

(72) Inventors: Martin Schmid, Hamburg (DE); Christian Bartels, Hamburg (DE); Frank Klimpel, Hamburg (DE); Klaus Vehlhaber, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 512 days.

(21) Appl. No.: 14/231,993

(22) Filed: Apr. 1, 2014

(65) Prior Publication Data

US 2014/0295747 A1    Oct. 2, 2014

(30) Foreign Application Priority Data

Apr. 2, 2013    (EP) .................................... 13161947

(51) Int. Cl.
*B64D 13/00*    (2006.01)
*B64D 13/06*    (2006.01)

(52) U.S. Cl.
CPC ...... *B64D 13/00* (2013.01); *B64D 2013/0611* (2013.01); *B64D 2013/0618* (2013.01); *B64D 2241/00* (2013.01); *Y02T 50/56* (2013.01)

(58) Field of Classification Search
CPC .... B64D 2013/0611; B64D 2013/0618; B64D 2241/00; Y02T 50/56

(Continued)

(56) References Cited

U.S. PATENT DOCUMENTS

| 4,174,083 A | 11/1979 | Mohn |
| 4,836,473 A | 6/1989 | Aulehla et al. |

(Continued)

FOREIGN PATENT DOCUMENTS

| DE | 102007052817 | 5/2009 |
| DE | 102008026117 | 12/2009 |

(Continued)

OTHER PUBLICATIONS

English translation of abstract of EP 1439123A2 document.*
European Search Report, Sep. 3, 2013.

*Primary Examiner* — Helena Kosanovic
(74) *Attorney, Agent, or Firm* — Greer, Burns & Crain, Ltd.

(57) ABSTRACT

An aircraft ram air channel assembly having: a first ram air inlet with a deflector protruding from the aircraft outer skin, the deflector guiding an air flow into a first ram air inlet channel; a second ram air inlet having a cross-sectional area flush with the outer skin, the second inlet being coupled to a second ram air inlet channel and arranged proximate to the first inlet upstream of the first inlet; and a flap pivotable about an axis between first and second operating positions. The axis is upstream of the first and second inlets and extends perpendicular to the air flow. The flap in its first position projects into the second inlet channel to control air flow through the second inlet into the second inlet channel, and in its second position projects into the air flow to prevent foreign objects from entering the first and second inlets.

6 Claims, 6 Drawing Sheets

(58) Field of Classification Search
USPC .......................................................... 454/76
See application file for complete search history.

(56) References Cited

U.S. PATENT DOCUMENTS

| | | | |
|---|---|---|---|
| 2003/0177780 A1* | 9/2003 | Brutscher | B64D 13/06 62/401 |
| 2008/0099631 A1 | 5/2008 | Parikh et al. | |
| 2011/0073716 A1 | 3/2011 | Klimpel | |
| 2011/0136425 A1 | 6/2011 | Elchholz et al. | |
| 2012/0240599 A1 | 9/2012 | Stolte | |

FOREIGN PATENT DOCUMENTS

| | | | |
|---|---|---|---|
| DE | 102011014565 | 9/2012 | |
| EP | 1439123 A2 * | 7/2004 | B64D 13/08 |
| WO | 2009064288 | 5/2009 | |

* cited by examiner

RAM AIR CHANNEL ASSEMBLY AND METHOD FOR OPERATING A RAM AIR CHANNEL ASSEMBLY

CROSS-REFERENCES TO RELATED APPLICATIONS

This application claims the benefit of the European patent application No. 13 161 947.0 filed on Apr. 2, 2013, the entire disclosures of which are incorporated herein by way of reference.

BACKGROUND OF THE INVENTION

The present invention relates to a ram air channel assembly for use in an aircraft and to a method for operating the ram air channel assembly.

Commercial aircraft typically employ a number of ambient air consuming systems in order to provide a high level of comfort and safety for the crew and the passengers on board the aircraft. One prominent example of such an ambient air consuming system is the air conditioning system of the aircraft. It allows for cooling the air in the aircraft cabin, which could else be heated by sun irradiance, body heat of the passengers, and on-board devices to an uncomfortable level. Moreover, the air conditioning system supplies the passenger cabin with fresh air in order to ensure a sufficiently high oxygen concentration therein. An exemplary air conditioning system is described in documents DE 10 2011 014 565 A1 and US 2012/240599 A1. Further examples for ambient air consuming systems are ventilation systems, such as systems for unpressurized bay ventilation.

The feeding of ambient air consuming systems with ambient air typically occurs via ram air inlet channels. In general, an air flow that passes a section of the aircraft outer skin enters the ram air inlet channel via a ram air inlet and thereafter is guided to the respective ambient air consuming system. The air flow guided to the ambient air consuming system is limited by the number of ram air inlets provided in the aircraft outer skin and the cross sectional area of the respective ram air inlet channels. The heated air flow exits the aircraft through ram air outlets or is supplied to the cabin.

Documents DE 10 2008 026 117 A1 and US 2011/0136425 A1 describe a ram air inlet assembly featuring a first ram air inlet and a secondary air inlet that is spaced apart from the first ram air inlet. The assembly further comprises a movably mounted flap, which can be moved into a first position and into a second position. In the first position, the flap essentially covers the secondary air inlet. In the second position, the flap at least partially opens the secondary air inlet and at least in certain areas extends into the air flow directed toward the first ram air inlet in order to shield the first ram air inlet from foreign matter.

SUMMARY OF THE INVENTION

The present invention is directed to the object to provide a light-weight and aerodynamically optimized ram air channel assembly which can be operated in a particularly reliable manner. Further, the invention is directed to the object to provide a method of operating a ram air channel assembly of this kind.

A ram air channel assembly for an aircraft comprises a first ram air inlet having a protruding portion which protrudes from an outer surface of a section of an aircraft outer skin. The first ram air inlet is coupled to a first ram air inlet channel. The protruding portion may comprise a deflector adapted to guide an air flow that passes the section of the aircraft outer skin during flight operation of an aircraft equipped with the ram air channel assembly into the first ram air inlet channel. The ram air inlet channel assembly further comprises a second ram air inlet having a cross-sectional area arranged flush with the section of the outer skin of the aircraft. The second ram air inlet is coupled to a second ram air inlet channel, and is arranged proximate to the first ram air inlet at a predetermined distance from the first ram air inlet upstream of the first ram air inlet.

When the ram air channel assembly is mounted in an aircraft, the second ram air inlet preferably is arranged at a predetermined distance from the first ram air inlet in a direction along a longitudinal axis of the aircraft. Within the context of this application, the terms "upstream" and "downstream" are used with reference to a direction of flow of the air flow that passes the section of the aircraft outer skin during flight operation of an aircraft equipped with the ram air channel assembly. Typically, the air flow follows the contour of the aircraft outer skin in a general direction which, during flight operation of an aircraft, is opposed to the flight direction of the aircraft. Hence, when the ram air channel assembly is mounted in an aircraft, the second ram air inlet is arranged at a predetermined distance from the first ram air inlet in a direction of a nose of the aircraft The ram air channel assembly further comprises a flap, which, at least in sections, is pivotable about an axis relative to the section of the aircraft outer skin between a first and a second operating position. The axis is arranged upstream of the first and the second ram air inlet and extends in a direction substantially perpendicular to the direction of flow of the air flow passing the section of the aircraft outer skin. In the ram air channel assembly, the entire flap may be pivotable about the axis relative to the section of the aircraft outer skin. It is, however, also conceivable that the flap comprises plural sections, wherein only one section, typically the section disposed adjacent to the axis, is pivotable about the axis relative to the section of the aircraft outer skin. In its first operating position, the flap projects into the second ram air inlet channel, in order to control the air flow through the second ram air inlet into the second ram air inlet channel. In its second operating position, the flap projects into the air flow passing the section of the aircraft outer skin, in order to prevent foreign objects from entering the first and the second ram air inlet opening.

When the flap is arranged in its first or second operating position and projects into the second ram air inlet or into the air flow passing the section of the aircraft outer skin, respectively, the flap may be inclined with respect to the section of the aircraft outer skin and may define an inclination angle with the section of the aircraft outer skin. Specifically, in its first operating position, the flap may define a positive inclination angle with the section of the aircraft outer skin, whereas the flap being disposed in its second operation position may define a negative inclination angle with the section of the aircraft outer skin.

In its first operating position, the flap may define various inclination angles with the section of the aircraft outer skin, in order to control the air flow through the second ram air inlet into the second ram air inlet channel. Preferably, however, the maximum inclination angle which is defined between the flap being disposed in its first operation position and the section of the aircraft outer skin does not exceed approximately 10°. When the flap, in its first operating position, defines its maximum inclination angle with the aircraft outer skin, the flap allows a maximum air flow into the second ram air channel. When the flap, in its first operating position, defines an inclination angle of less than the maximum inclination angle with the aircraft outer skin, the flap lowers the air flow into the second ram air channel. Finally, the flap, in its first operating position, may extend flush with the section of the aircraft outer skin and hence close the second ram air inlet, while still allowing ram air to enter the first ram air inlet. The inclination angle which is defined between the flap being disposed in its second operation position and the section of the aircraft outer skin advantageously may be larger than approximately −45°.

In the ram air channel assembly, the flap fulfills the double function to control the air flow through the second ram air inlet into the second ram air inlet channel in its first operating position, and to protect the first and the second ram air inlet from foreign object damage in its second operating position. Hence, the ram air inlet channel assembly can be operated in a safe and reliable manner and, at the same time, can be of a particularly lightweight design. Further, since the flap, in its first operating position, projects into the second ram air inlet channel, the flap allows ram air to enter the first ram air channel, but adds to the aerodynamic drag and thus the additional fuel consumption of the aircraft only to a limited extent.

Preferably, the width of the second ram air inlet in the direction perpendicular to the direction of flow of the air flow passing the section of the aircraft outer skin is equal to or exceeds the width of the first ram air inlet. However, the width of the first ram air inlet in the direction perpendicular to the direction of flow of the air flow passing the section of the aircraft outer skin may alternatively exceed the width of the second ram air inlet. For example, the width of the second ram air inlet in the direction perpendicular to the direction of flow of the air flow passing the section of the aircraft outer skin and perpendicular to the longitudinal axis of the aircraft may exceed the width of the first ram air inlet opening by more than approximately 10%. Advantageously, the length of the first ram air inlet in the direction of flow of the air flow passing the section of the aircraft outer skin and along the longitudinal axis of the aircraft may exceed the length of the second ram air inlet. This design allows both, the first and the second ram air inlet channel, to be supplied with a sufficient amount of ram air, while still maintaining a compact design and a low weight of the ram air channel assembly.

In a preferred embodiment of the invention, the first ram air inlet channel is coupled to a first ambient air consuming system of the aircraft and the second ram air inlet channel is coupled to a second ambient air consuming system of the aircraft. Alternatively, both ram air inlet channels may be coupled to the same ambient air consuming system.

Preferably, the first and the second ram air inlet channel are formed separate from each other. In particular, the first and the second ram air inlet channel may be designed so as to be independent from each other without a connection being provided between the first and the second ram air inlet channel. Hence, ambient air consuming systems connected to the first and the second ram air inlet channel, respectively, can be supplied with ambient air independent from each other.

The first and the second ambient air consuming system may be selected from the group of a fresh air generation system of an aircraft air conditioning system, an emergency ventilation system, a system for unpressurized bay ventilation, a heat exchanger, and an auxiliary power unit. Preferably, the second ram air channel is associated with a heat exchanger for cooling purposes, while the first ram air channel may be utilized as a fresh air supply for the aircraft cabin. Alternatively, one of the first and the second ram air inlet channel is associated with a fresh air generation system of an air conditioning system of the aircraft and the other ram air inlet channel is associated with a system for unpressurized bay ventilation. In another alternative, the first ram air channel is associated with a system for unpressurized bay ventilation, and the second ram air channel is associated with a fresh air generation system of an aircraft air conditioning system. In such a configuration, the unpressurized bay can be constantly ventilated, as it is generally desired for ideal pressure conditions within the aircraft, while the volume flow of ram air supplied to the fresh air generation system of the aircraft air conditioning system can be flexibly adapted in dependence on the operational state of the aircraft air conditioning system.

The first ram air inlet channel, in an inlet region thereof, may be provided with a linearly inclined wall portion. Alternatively or additionally thereto, the second ram air inlet channel, in an inlet region thereof, may be provided with a linearly inclined wall portion. The linearly inclined wall portion of the first and/or the second ram air inlet channel may define an inclination angle with the section of the aircraft outer skin which may be selected in dependence on the maximum inclination angle, the flap defines with the section of the aircraft outer skin, in particular in its first operating position. Specifically, the inclination angle between the linearly inclined wall portion of the second ram air inlet channel and the section of the aircraft outer skin may be larger than the maximum inclination angle defined between the flap in its first operating position and the section of the aircraft outer skin. For example, the inclination angle between the linearly inclined wall portion of the second ram air inlet channel and the section of the aircraft outer skin may be approximately 15°, wherein the maximum inclination angle defined between the flap in its first operating position and the section of the aircraft outer skin may be approximately 10°. Further, the inclination angle between the linearly inclined wall portion of the first ram air inlet channel and the section of the aircraft outer skin may be smaller than the inclination angle defined between the linearly inclined wall portion of the second ram air inlet channel and the section of the aircraft outer skin.

The protruding portion of the first ram air inlet may have the shape of a scoop air inlet, allowing an efficient supply of ram air into the first ram air inlet channel. The first ram air inlet may be designed in the form of a NACA (National Advisory Committee for Aeronautics) inlet.

The ram air channel assembly may further comprise a ram air outlet having a cross-sectional area arranged flush with the section of the aircraft outer skin. The ram air outlet may be coupled to a ram air outlet channel which may serve to discharge ram air supplied to the aircraft via at least one ram air inlet channel, for example the first and/or the second ram air inlet channel, from the aircraft back into the environment. Preferably, the ram air outlet is arranged proximate to the first ram air inlet at a predetermined distance from the first ram air inlet opening downstream of the first ram air inlet opening. When the ram air channel assembly is mounted in an aircraft, the ram air outlet preferably is arranged at a predetermined distance from the first ram air inlet channel in a direction along a longitudinal axis of the aircraft and in a direction of a tail of the aircraft.

A ram air channel assembly which may be claimed in independent form comprises a first ram air inlet having a protruding portion which protrudes from an outer surface of a section of an aircraft outer skin. The first ram air inlet may be coupled to a first ram air inlet channel. The protruding portion may comprise a deflector adapted to guide an air flow that passes the section of the aircraft outer skin during flight operation of an aircraft equipped with the ram air channel assembly into the first ram air inlet channel. This ram air inlet channel assembly further comprises a ram air outlet having a cross-sectional area arranged flush with the section of the aircraft outer skin. The ram air outlet may be coupled to a ram air outlet channel which may serve to discharge ram air supplied to the aircraft via at least one ram air inlet channel, for example the first ram air inlet channel, from the aircraft back into the environment. The ram air outlet is arranged proximate to the first ram air inlet at a predetermined distance from the first ram air inlet opening downstream of the first ram air inlet opening. When the ram air channel assembly is mounted in an aircraft, the ram air outlet preferably is arranged at a predetermined distance from the first ram air inlet channel in a direction along a longitudinal axis of the aircraft and in a direction of a tail of the aircraft.

A ram air inlet channel assembly comprising a first ram air inlet having a protruding portion which protrudes from an outer surface of a section of an aircraft outer skin and a ram air outlet may further comprise some or all of the features of the ram air inlet channel assembly provided with a first and a second ram air inlet. These features, however, are not essential for this ram air inlet channel assembly.

The ram air outlet channel, in an outlet region thereof, may be provided with a linearly inclined wall portion. The inclined wall portion of the ram air outlet channel may define an inclination angle with the section of the aircraft outer skin which is larger than the inclination angle defined between the inclined wall portion of the first or the second ram air inlet channel and the section of the aircraft outer skin. For example, the inclination angle defined between the inclined wall portion of the ram air outlet channel and the section of the aircraft outer skin may be in the range of approximately 25° to approximately 45°. Preferably, the inclination angle defined between the inclined wall portion of the ram air outlet channel and the section of the aircraft outer skin is approximately 30°.

The ram air channel assembly may further comprise at least one elongated stabilization rod. Advantageously, the stabilization rod may be pivotably coupled to the flap and/or to a rail system. Preferably, the stabilization rod and the rail system are adapted to interact with each other in order to set an inclination angle of the flap relative to the section of the aircraft outer skin. The rail system may be arranged in the second ram air inlet channel and, in particular, may be fastened to the inclined wall portion of the second ram air inlet channel.

The section of the aircraft outer skin accommodating the first ram air inlet and the second ram air inlet may be curved in the direction substantially perpendicular to the direction of flow of the air flow passing the section of the aircraft outer skin. Such an arrangement allows for utilizing the available space within the aircraft in a particularly efficient manner.

The section of the aircraft outer skin accommodating the first ram air inlet and the second ram air inlet may comprise a lowered portion which is lowered relative to the aircraft outer skin surrounding the ram air channel assembly. The lowered portion of the section of the aircraft outer skin may be disposed between the first and the second ram air inlet so as to separate the first and the second ram air inlet from each other. In this configuration of the ram air channel assembly, the protruding portion of the first ram air inlet may protrude from the lowered portion of the section of the aircraft outer skin. An outer surface of the protruding portion of first ram air inlet, however, may be arranged flush with the aircraft outer skin surrounding the ram air channel assembly. Consequently, the protruding portion of the first ram air inlet does not protrude relative to the aircraft outer skin surrounding the ram air channel allowing the additional aerodynamic drag caused by the ram air channel assembly to be further reduced.

In particular in a ram air channel assembly which comprises a first ram air inlet, the protruding portion of which protrudes from a lowered portion of the section of the aircraft outer skin, the cross-sectional area of the second ram air inlet may be lowered and inclined relative to the aircraft outer skin surrounding the ram air channel assembly. Specifically, the cross-sectional area of the second ram air inlet may be inclined starting from a level of the aircraft outer skin adjacent to the ram air channel assembly upstream of the ram air channel assembly in the direction of the first ram air inlet until reaching the lowered portion of the section of the aircraft outer skin separating the first and the second ram air inlet.

The flap may comprise a first section that is preferably arranged adjacent to the axis about which the flap is pivotable. Advantageously, the flap may further comprise a second section that may be arranged downstream of the first section. In order to reduce turbulences arising at an end of the first section of the flap which faces the second section of the flap when the air flow passes the section of the aircraft outer skin, which is particularly the case when the flap is disposed in its second operating position, the second section may be joined to the first section. In particular, the second section may be pivotably coupled to the first section, for example by a hinge. In such a configuration, an end of the second section which faces the first section is preferably pivotably coupled to the end of the first section which faces the second section by the hinge.

Preferably, the second section projects into the second ram air inlet channel independent of the operating position of the flap. Therefore, with respect to the section of the aircraft outer skin, the first and the second section of the flap may be inclined in opposite directions. For example, when the flap is in its first operating position with its first section projecting into the air flow passing the section of the aircraft outer skin, the second section may still project into the second ram air inlet channel.

The ram air channel assembly may further comprise an actuating device which is adapted to interact with the first and/or the second section of the flap in order to set an inclination angle of the first and/or the second section of the flap relative to the section of the aircraft outer skin. Preferably, the actuating device is adapted to pivot the second section of the flap about an axis which is arranged in the region of an end of the second section which faces away from the first section in order to set an inclination angle of the front section of the flap relative to the section of the aircraft outer skin. The actuating device may be coupled to the hinge and may comprise the elongated stabilization rod and/or the rail system.

In a preferred embodiment of the invention, the actuating device may comprise a drive, which may be an electromechanic, a hydraulic, or a pneumatic drive. Advantageously, the drive may cause a linear or rotational displacement of a deflection mechanism, which in turn may cause a movement of the second section of the flap. The deflection mechanism may be adapted to convert the direction and magnitude of a force vector or a displacement vector provided by the drive. Furthermore, the deflection mechanism may comprise at least one pivot axis and may be pivotably coupled to the second section of the flap. When the first section is coupled to the second section by the hinge, the displacement of the second section may result in a displacement of the first section.

The ram air channel assembly may further comprise a control unit for controlling an operation of the flap. Specifically, the control unit may be adapted to control the flap into its first operating position when the aircraft is flying at cruising altitude, and to control the flap into its second operating position during take-off and/or landing of the aircraft. During take-off and/or landing of the aircraft, the first and the second ram air inlet thus can be protected from foreign object damage in a particularly effective manner. Contrary thereto, the flap is used to control the ram air flow into the second ram air inlet channel when the aircraft is flying at cruising altitude, wherein the flap projects in an aerodynamically favorable manner into the second ram channel.

In a method for operating a ram air channel assembly as described above, the flap is controlled into its first operating position when the aircraft is flying at cruising altitude. Furthermore, the flap is controlled into its second operating position during take-off and/or landing of the aircraft.

BRIEF DESCRIPTION OF THE DRAWINGS

Preferred embodiments of a ram air channel assembly in the following are described in greater detail with reference to the attached schematic drawings, wherein.

DETAILED DESCRIPTION OF THE PREFERRED EMBODIMENTS

Figure 1:
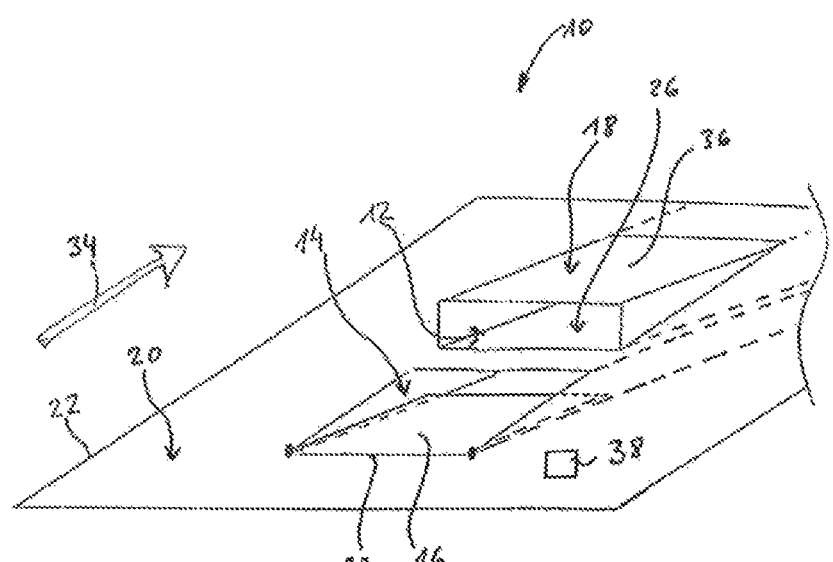
FIG. 1 shows a perspective view of a first embodiment of a ram air channel assembly, wherein a flap of the ram air channel assembly is arranged in a first operating position.
Figure 2:
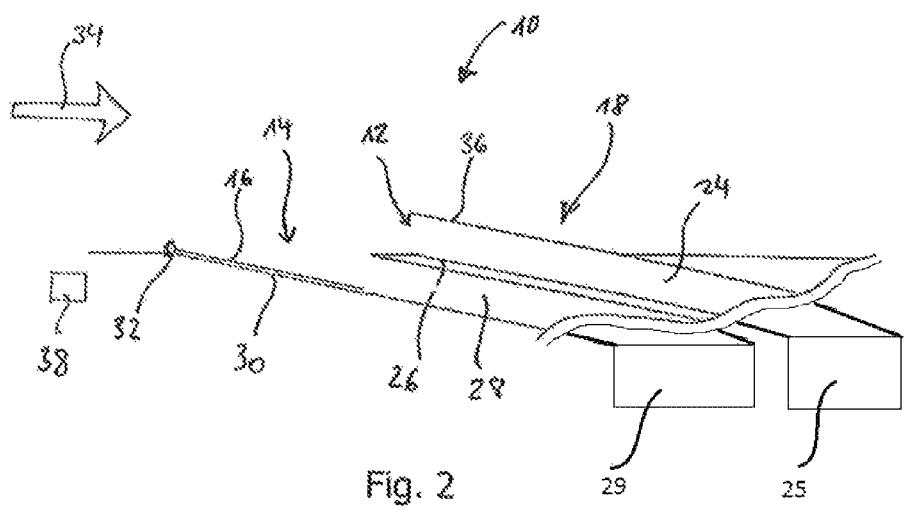
FIG. 2 shows a cross-sectional view of the ram air channel assembly according to FIG. 1.
Figure 3:
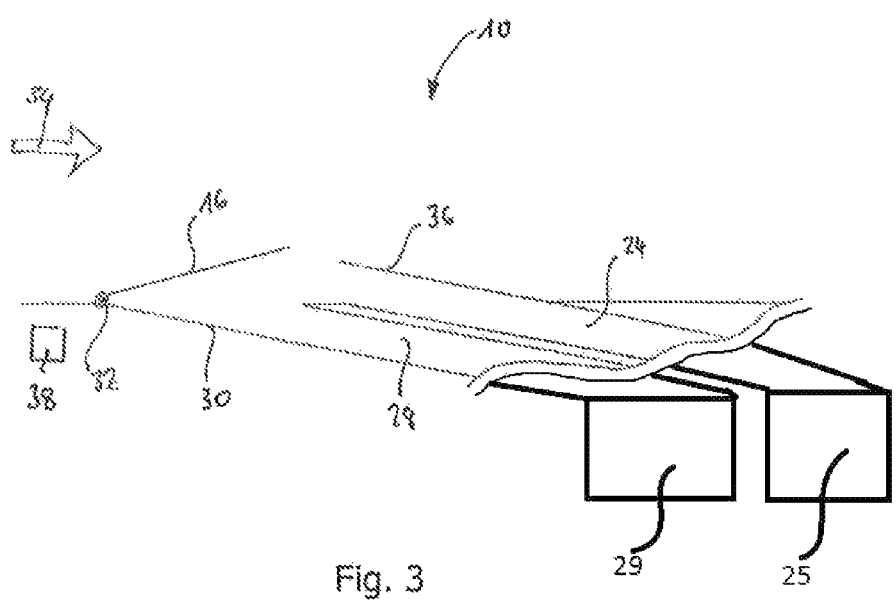
FIG. 3 shows a cross-sectional view of the ram air channel assembly according to FIG. 2, wherein the flap of the ram air channel assembly is arranged in a second operating position.

FIGS. 1, 2 and 3 show a first embodiment of a ram air channel assembly 10. The ram air channel assembly 10 comprises a first ram air inlet 12, a second ram air inlet 14 that is arranged at a distance from the first ram air inlet 12, and a flap 16. When the ram air channel assembly 10 is mounted in an aircraft, the second ram air inlet 14 is arranged at a predetermined distance from the first ram air inlet 12 in a direction along a longitudinal axis of the aircraft towards a nose of the aircraft. Hence, with reference to a direction of flow 34 of an air flow that passes an outer skin of the aircraft during flight operation of the aircraft, the second ram air inlet 14 is arranged upstream of the first ram air inlet 12. In a direction perpendicular to the direction of flow 34 of the air flow that passes the outer skin of the aircraft during flight operation of an aircraft, the width of the second ram air inlet 14 exceeds the width of the first ram air inlet 12 by about 5%.

The first ram air inlet 12 comprises a protruding portion 18 which is designed in the form of a scoop air inlet and protrudes from an outer surface 20 of a section 22 of the aircraft outer skin. The first ram air inlet 12 is coupled to a first ram air inlet channel 24, which, at an inlet region thereof, has a linearly inclined wall portion 26. The first ram air channel 24 serves to supply ram air to a first ambient air consuming system 25 of the aircraft. The protruding portion 18 comprises a deflector 36 adapted to guide an air flow that passes the section 22 of the aircraft outer skin into the first ram air inlet channel 24.

The second ram air inlet 14 has a cross-sectional area that is arranged flush with the section 22 of the outer skin of the aircraft and is coupled to a second ram air inlet channel 28, which, at an inlet region thereof, has a linearly inclined wall portion 30. The second ram air channel 28 serves to supply ram air to a second ambient air consuming system 29 of the aircraft. The first and the second ram air inlet channel 24, 28 are formed separate from each other, thus allowing the first and the second ambient air consuming system to be independently supplied with ram air.

The flap 16 is pivotable about a flap axis 32 relative to the section 22 of the aircraft outer skin between a first and a second operating position, wherein the flap axis 32 is arranged upstream of the second ram air inlet 14 and extends in a direction substantially perpendicular to the direction of flow 34 of the air flow passing the section 22 of the aircraft outer skin during flight operation of the aircraft. The direction of flow 34 is substantially opposed to the flight direction of the aircraft.

In FIGS. 1 and 2, the flap 16 is shown in its first operating position, in which it projects into the second ram air channel 28 in order to control the air flow through the second ram air inlet 14 into the second ram air channel 28. When the flap 16 is disposed in its first operating position, the air flow passing the section 22 of the aircraft outer skin follows an outer surface of the flap 16 into the second ram air channel 28. In its first operating position, the flap 16 defines a maximum inclination angle of approximately 10° with the section 22 of the aircraft outer skin. The maximum inclination angle defined between the flap 16 and the section 22 of the aircraft outer skin in the first operating position of the flap 16 is smaller than an inclination angle between the linearly inclined wall portion 30 of the second ram air inlet channel 28 and the section 22 of the aircraft outer skin, which is set to approximately 15°, in order to ensure proper operation of the flap 16.

When the flap 16 is arranged in its second operating position and projects into the air flow passing the section 22 of the aircraft outer skin as shown in FIG. 3, the flap 16 prevents foreign objects from entering the first and the second ram air inlet 12, 14. In its second operating position, the flap 16 defines an inclination angle of approximately −30° with the section 22 of the aircraft outer skin. As shown in FIG. 3, the flap 16 projects deeply enough into the air flow passing the section 22 of the aircraft outer skin that both, the first and the second ram air inlet 12, 14 are entirely shielded.

The ram air channel assembly 10 further comprises a control unit 38 for controlling the operation of the flap 16. For example, the control unit 38 may control a drive unit such as, for example an electric drive motor (not shown) which serves to drive the flap 16 into the desired operating position. Specifically, the control unit 38 controls the flap 16 into its first operating position when the aircraft is flying at cruising altitude. Hence, when the aircraft is flying at cruising altitude, the flap 16 is used to control the ram air flow into the second ram air inlet channel 28. Of course, the flap 16, under the control of the control unit 38, may be moved from the first operating position shown in FIGS. 1 and 2, wherein the flap 16 defines a maximum inclination angle of approximately 10° with the section 22 of the aircraft outer skin into a modified first operating position, wherein the flap 16 defines an inclination angle of less than 10° with the section 22 of the aircraft outer skin, in order to lower the air flow into the second ram air channel 28. Further, it is conceivable to control the flap 16 into a further modified first operating position, wherein the flap 16 extends flush with the section 22 of the aircraft outer skin and hence closes the second ram air inlet 14.

During take-off and landing of the aircraft, the control unit 38 controls the flap 16 into its second operating position. Hence, during take-off and landing of the aircraft, the flap 16 protects the first and the second ram air inlet 12, 14 from foreign object damage.

Figure 4:
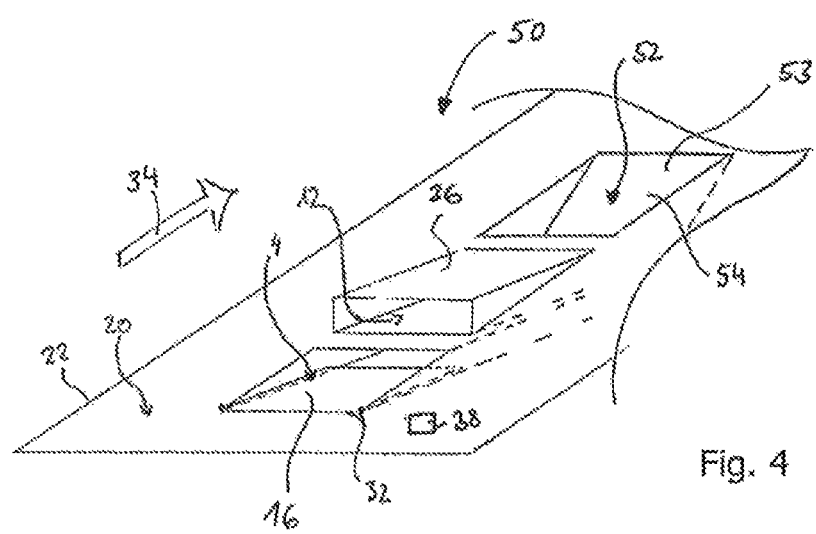
FIG. 4 shows a perspective view of a second embodiment of a ram air channel assembly, wherein a flap of the ram air channel assembly is arranged in a first operating position.
Figure 5:
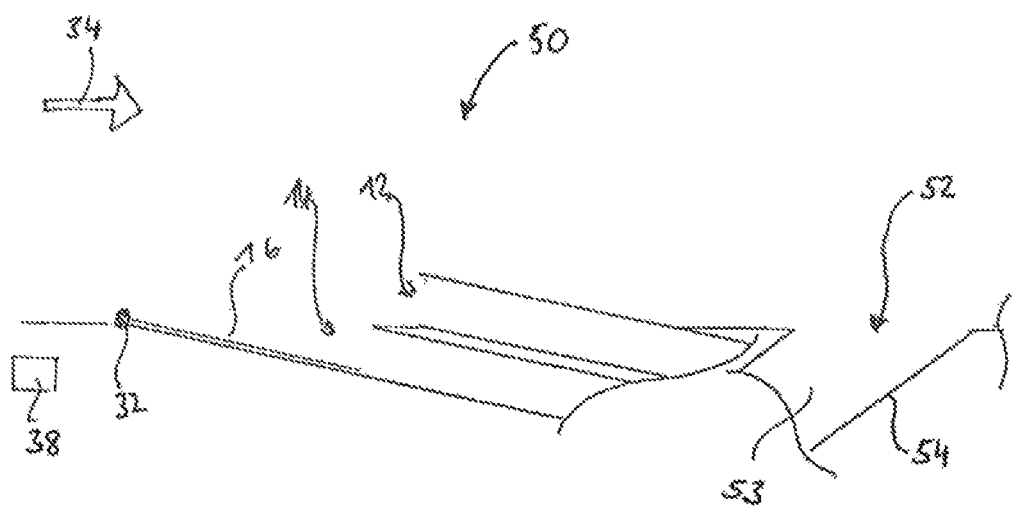
FIG. 5 shows a cross-sectional view of the ram air channel assembly according to FIG. 4.

FIGS. 4 and 5 show a second embodiment of a ram air channel assembly 50 which differs from the first embodiment according to FIGS. 1 to 3 in that the ram air channel assembly 50 comprises an additional ram air outlet 52 that is arranged downstream of the first ram air inlet 12. When the ram air channel assembly 50 is mounted in an aircraft, the ram air outlet 52 is arranged at a predetermined distance from the first ram air inlet 12 in a direction along a longitudinal axis of the aircraft and in a direction of a tail of the aircraft. A cross-sectional area of the ram air outlet 52 is arranged flush with the section of the aircraft outer skin 22. The ram air outlet 52 is coupled to a ram air outlet channel 53, which serves to discharge ram air supplied to the aircraft via at least one ram air inlet channel, in particular the first and/or the second ram air inlet channel 24, 28, from the aircraft back into the environment. The ram air outlet channel 53, in an outlet region thereof, is provided with a linearly inclined wall portion 54 which defines an inclination angle of approximately 30° with the section 22 of the aircraft outer skin.

Otherwise, the structure and the function of the ram air channel assembly 50 according to FIGS. 4 and 5 correspond to the structure and the function of the ram air channel assembly 10 according to FIGS. 1 to 3.

Figure 6:
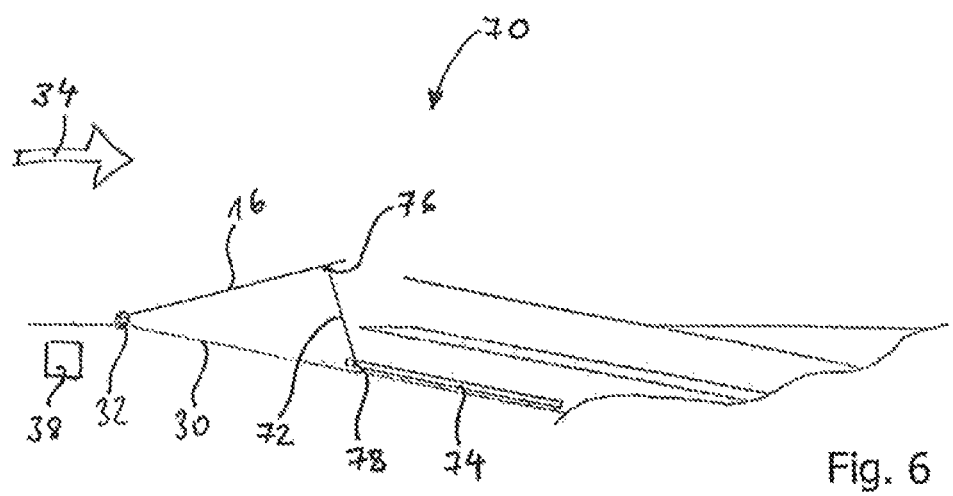
FIG. 6 shows a cross-sectional view of a third embodiment of a ram air channel assembly, wherein a flap of the ram air channel assembly is arranged in a second operating position.
Figure 7:
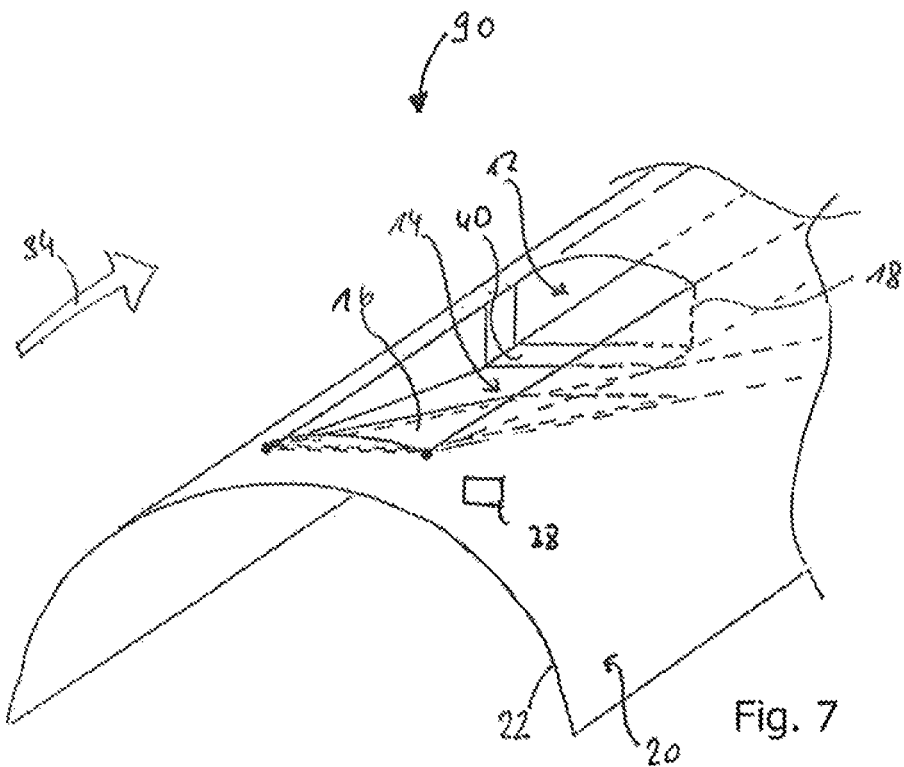
FIG. 7 shows a perspective view of a fourth embodiment of a ram air channel assembly, wherein a flap of the ram air channel assembly is arranged in a first operating position.
Figure 8:
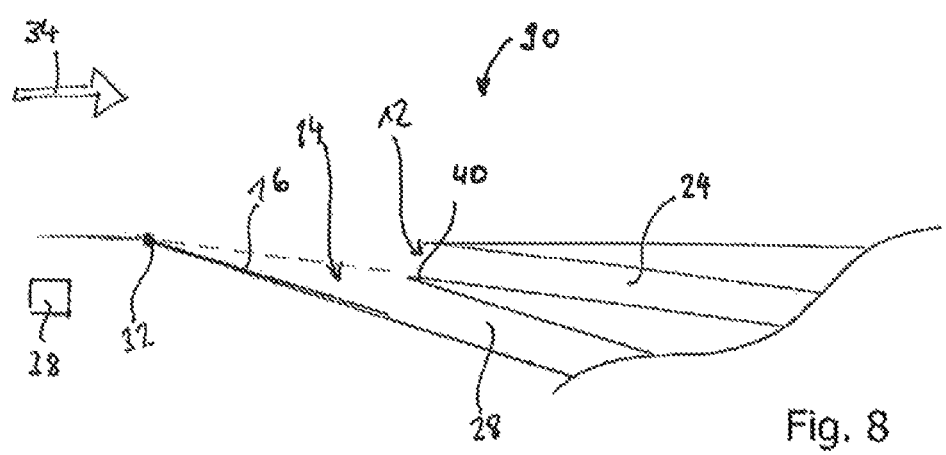
FIG. 8 shows a cross-sectional view of the ram air channel assembly according to FIG. 7.

In a third embodiment which is shown in FIG. 6, a ram air channel assembly 70 comprises an elongated stabilization rod 72, which is pivotably coupled to the flap 16 and to a rail system 74. The pivotable coupling to the flap 16 is implemented by a first bearing 76, and the pivotable coupling to the rail system 74 is implemented by a second bearing 78. The stabilization rod 72 and the rail system 74 are adapted to interact with each other in order to set an inclination angle of the flap 16. In the ram air channel assembly 70 of FIG. 6, the rail system 74 is arranged in the second ram air channel 28 and fastened to the inclined wall portion 30 of the second ram air inlet channel 28.

Otherwise, the structure and the function of the ram air channel assembly 70 according to FIG. 6 correspond to the structure and the function of the ram air channel assembly 10 according to FIGS. 1 to 3.

FIGS. 7 to 10 show a fourth embodiment of a ram air channel assembly 90, wherein the section 22 of the aircraft outer skin accommodating the first ram air inlet 12 and the second ram air inlet 14 is curved in the direction substantially perpendicular to the direction of flow 34 of the air flow passing the section 22 of the aircraft outer skin, i.e. in a direction perpendicular to a longitudinal axis of an aircraft equipped with the ram air channel assembly 90. Further, the section 22 of the aircraft outer skin accommodating the first ram air inlet 12 and the second ram air inlet 14 comprises a lowered portion 40 which is lowered relative to the aircraft outer skin surrounding the ram air channel assembly 90. The lowered portion 40 of the section 22 of the aircraft outer skin is disposed between the first and the second ram air inlet 12, 14 so as to separate the first and the second ram air inlet 12, 14 from each other. Thus, the protruding portion 18 of first ram air inlet 12 protrudes from the lowered portion 40 of the section 22 of the aircraft outer skin. An outer surface of the protruding portion 18 of first ram air inlet 12, however, is arranged flush with the aircraft outer skin surrounding the ram air channel assembly 90.

Further, the cross-sectional area of the second ram air inlet 14 is lowered and inclined relative to the aircraft outer skin surrounding the ram air channel assembly 90. Specifically, the cross-sectional area of the second ram air inlet 14 is inclined starting from a level of the aircraft outer skin adjacent to the ram air channel assembly 90 upstream of the ram air channel assembly 90 in the direction of the first ram air inlet 14 until reaching the lowered portion 40 of the section 22 of the aircraft outer skin separating the first and the second ram air inlet 12, 14.

Like in the ram air channel assemblies 10, 50, 70 according to FIGS. 1 to 6, the flap 16 of the ram air channel assembly 90 shown in FIGS. 7 to 10, in its first operating position, defines a maximum inclination angle of approximately 10° with the aircraft outer skin surrounding the ram air channel assembly 90, in order to allow a maximum volume flow of ram air entering the second ram air channel 28. In order to close the second ram air inlet 14, the flap 16, however, no longer is arranged flush with the section 22 of the aircraft outer skin accommodating the ram air channel assembly 90 and the aircraft outer skin surrounding the ram air channel assembly 90, but still defines a positive inclination angle of, for example, approximately 5° with the aircraft outer skin surrounding the ram air channel assembly 90 (see position of the flap 16 indicated as a dashed line in FIG. 8).

Figure 9:
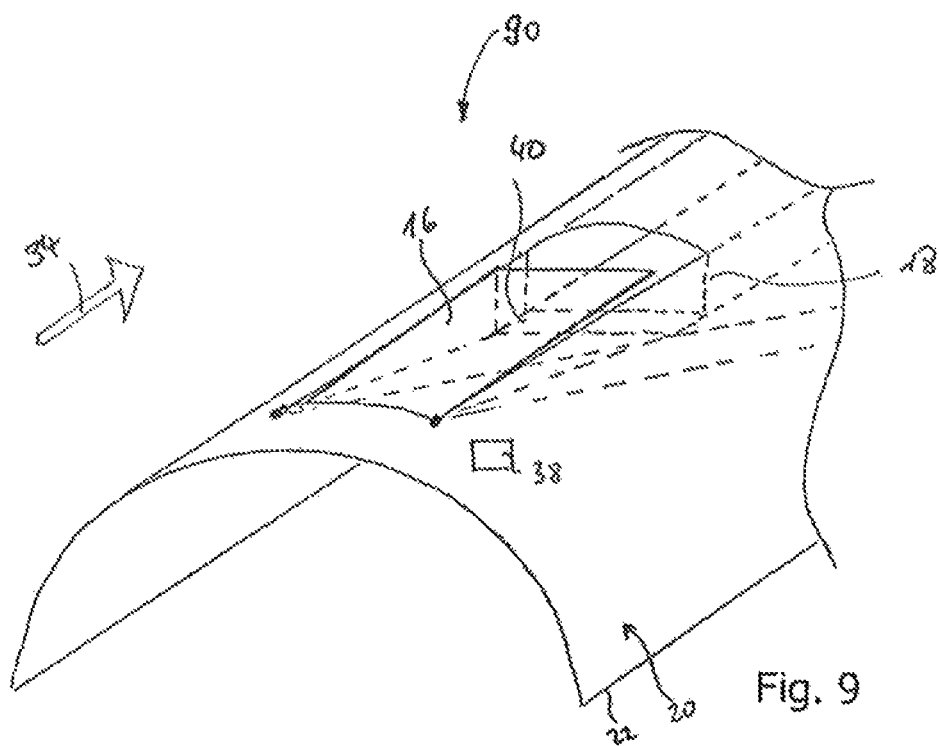
FIG. 9 shows a perspective view of the ram air channel assembly according to FIG. 7, wherein the flap of the ram air channel assembly is arranged in a second operating position.
Figure 10:
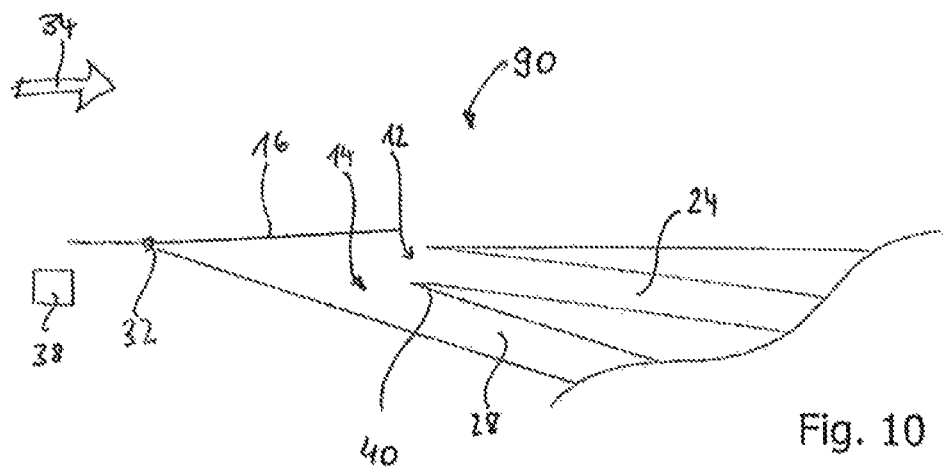
FIG. 10 shows a cross-sectional view of the ram air channel assembly according to FIG. 9.

When the flap 16 is arranged in its second operating position and projects into the air flow passing the section 22 of the aircraft outer skin as shown in FIGS. 9 and 10, in order to prevent foreign objects from entering the first and the second ram air inlet 12, 14, the flap 16 extends substantially flush with the aircraft outer skin surrounding the ram air channel assembly 90 or defines a small inclination angle of approximately −5° with the aircraft outer skin surrounding the ram air channel assembly 90. Hence, the flap 16, in its second operating position shields the first and the second ram air inlet 12, 14, but does not significantly add to the aerodynamic drag of the aircraft.

Otherwise, the structure and the function of the ram air channel assembly 90 according to FIGS. 7 to 10 correspond to the structure and the function of the ram air channel assembly 10 according to FIGS. 1 to 3.

Figure 11:
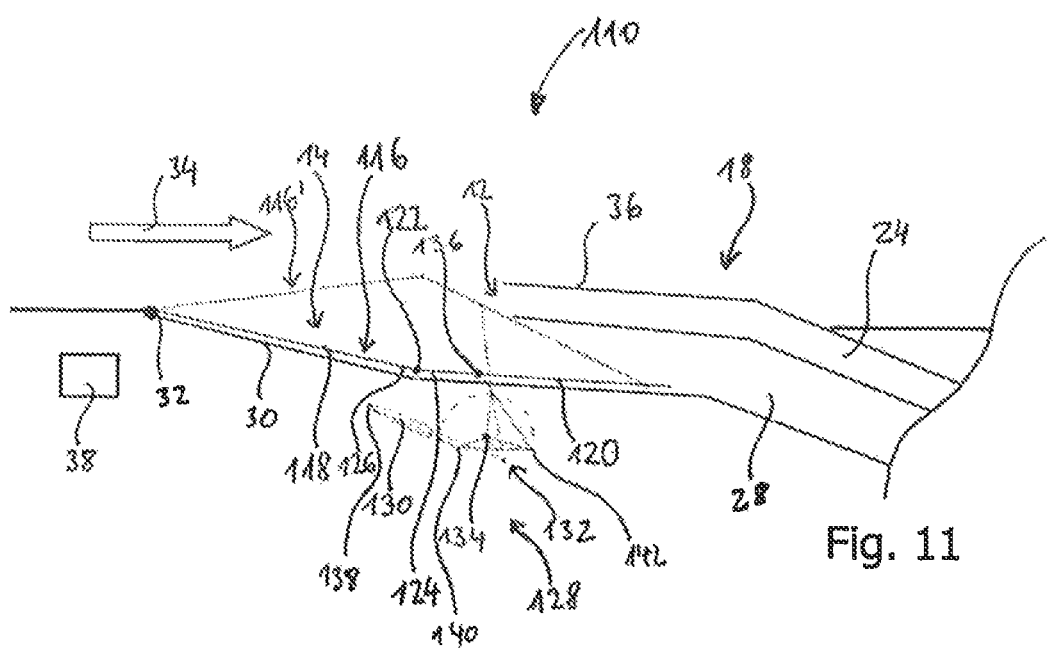
FIG. 11 shows a cross-sectional view of a fifth embodiment of a ram air channel assembly.

FIG. 11 shows a fifth embodiment of a ram air channel assembly 110. Again, the flap 16 is movable between a first operating position (shown in solid lines in FIG. 11) and a second operating position (shown in dashed lines in FIG. 11). The flap 16 comprises a first section 118 arranged adjacent to the axis 32, and a second section 120 arranged downstream of the first section. An end 124 of the second section 120 which faces the first section 118 is pivotably coupled to an end 126 of the first section 118 which faces the second section 120 by a hinge 122. The second section 120 projects into the second ram air inlet channel 28 independent of the operating position of the flap 16.

An actuating device 128 serves to interact with the second section 120 of the flap 16, in order to set an inclination angle of the first section 118 of the flap 16 relative to the section 22 of the aircraft outer skin. The actuating device 128 is pivotably coupled to the second section 120 of the flap 16, and comprises a hydraulic drive 130. The hydraulic drive 130 causes a linear or rotational displacement of a deflection mechanism 132, which in turn causes a displacement of the second section 120 of the flap 16. The deflection mechanism 132 converts the direction and magnitude of a force vector and a displacement vector provided by the hydraulic drive 130 by five pivot axes 134, 136, 138, 140, 142 and is pivotably coupled to the second section 120 of the flap 16.

Otherwise, the structure and the function of the ram air channel assembly 110 according to FIG. 11 correspond to the structure and the function of the ram air channel assembly 10 according to FIGS. 1 to 3.

Features described above in connection with only one embodiment of a ram air channel assembly may be employed also in other embodiments. For example, the ram air channel assembly 90 according to FIGS. 7 to 10 may be equipped with an elongated stabilization rod 72 and a rail system 74 as depicted in FIG. 6.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A ram air channel assembly for an aircraft, comprising:
   a first ram air inlet having a protruding portion which protrudes from an outer surface of a section of an aircraft outer skin, wherein the first ram air inlet is coupled to a first ram air inlet channel,
   a second ram air inlet having a cross-sectional area arranged flush with the section of the aircraft outer skin, wherein the second ram air inlet is coupled to a second ram air inlet channel and arranged proximate to the first ram air inlet at a predetermined distance from the first ram air inlet upstream of the first ram air inlet,
   a flap which, at least in sections, is pivotable about an axis relative to the section of the aircraft outer skin between a first and a second operating position, wherein the axis is arranged upstream of the first and the second ram air inlet and extends in a direction substantially perpendicular to a direction of flow of an air flow passing the section of the aircraft outer skin, and
   a control unit for controlling an operation of the flap, the control unit being adapted to control the flap into its first operating position when the aircraft is flying at cruising altitude,
   wherein the flap in its first operating position allows outside air to flow into the second ram air inlet channel and projects into the second ram air inlet channel in order to control the air flow through the second ram air inlet into the second ram air inlet channel, and in its second operating position projects into the air flow passing the section of the aircraft outer skin in order to prevent foreign objects from entering the first and the second ram air inlet,
   wherein the first ram air inlet channel is configured to be coupled to a first outside air consuming system of the aircraft and the second ram air inlet channel is configured to be coupled to a second outside air consuming system of the aircraft, and
   wherein the first and the second ram air inlet channel are formed separate from each other such that the first and second outside air consuming systems can be supplied with outside air independently from each other without a connection being provided between the first and the second ram air inlet channel.

2. The ram air channel assembly according to claim 1, wherein the first and the second outside air consuming systems are selected from the group of a fresh air generation system of an aircraft air conditioning system, an emergency ventilation system, a system for unpressurized bay ventilation, a heat exchanger, and an auxiliary power unit.

3. The ram air channel assembly according to claim 1, wherein at least one of the first and the second ram air inlet channel, in an inlet region thereof, is provided with a linearly inclined wall portion.

4. The ram air channel assembly according to claim 1, wherein the protruding portion of the first ram air inlet has the shape of a scoop air inlet.

5. The ram air channel assembly according to claim 1, wherein the control unit is further adapted to control the flap into its second operating position during take-off and/or landing of the aircraft.

6. A method for operating a ram air channel assembly according to claim 1, the method comprising the steps:
   controlling the flap into its first operating position when the aircraft is flying at cruising altitude, and
   controlling the flap into its second operating position during take-off and/or landing of the aircraft.

* * * * *